United States Patent Office 3,676,112
Patented July 11, 1972

3,676,112
ANTICARIOGENIC DENTAL AMALGAM
Joseph C. Muhler, Indianapolis, Ind., assignor to Indiana University Foundation, Bloomington, Ind.
No Drawing. Filed May 19, 1970, Ser. No. 38,889
Int. Cl. C22c 5/00; A61k 5/02
U.S. Cl. 75—173 R                              7 Claims

ABSTRACT OF THE DISCLOSURE

This invention relates to an anticariogenic dental amalgam and method of reducing dental caries at the margin of a dental restoration. Moreover, this invention relates to a specific dental amalgam additive, stannous hexafluorozirconate, $SnZrF_6$, that provides anticariogenic effectiveness without appreciably affecting the physical properties set forth by the American Dental Association for dental amalgam alloys.

BACKGROUND OF THE INVENTION

Field of the invention

This invention relates generally to dental amalgams and more particularly to dental amalgams with improved anticariogenic characteristics.

Description of prior art

It is commonly recognized that the presence of small amounts of fluorine in communal drinking water systems has a significant anticariogenic effect. Sodium fluoride, sodium silicofluoride, and hydrofluoric acid have been introduced in communal water supplies with good results. In addition, it is well known that topical application of aqueous fluoride solutions by a dentist or a dental hygienist provides an excellent measure of protection against dental caries. Further, commercially available stannous fluoride and sodium monofluorophosphate containing dentifrices have been shown to have a high degree of anticariogenic effectiveness.

Thus, it is well recognized in the art that various fluorine containing compounds provide varying degrees of anticariogenic effectiveness. With this knowledge, dental researchers have continued their efforts to find new and more effective anticaries agents and new methods to achieve anticariogenic effectiveness. Such methods have included the introduction of an anticariogenic agent to various oral compositions including dentifrices, mouthwashes, dental prophylaxis paste, and topical solutions.

Research to discover new anticariogenic agents has proved successful. For example, applicant is the inventor of stannous fluorozirconate, $SnZrF_6$, as disclosed in U.S. Pats. Nos. 3,266,867, and 3,266,996, a compound which has demonstrated a high degree of anticariogenic efficacy.

Silver dental amalgams, occasionally containing precious metals, have long been used as restorative materials in dental restorations. The method of performing a dental restoration using an amalgam is well known to the art. A dental restoration, commonly known as a "filling," is carried out by the proper preparation of the tooth cavity, by the removal of all decayed enamel and dentin, and by the insertion into the prepared cavity of a dental amalgam.

The American Dental Association's Specification No. 1 (hereafter "the ADA Specification") for alloys for dental amalgams provides that the chemical composition of the alloy used in forming dental amalgams shall conform to the following requirements:

Silver 65% by weight minimum
Tin 29% by weight maximum
Copper 6% by weight maximum
Zinc 2% by weight maximum
Mercury 3% by weight maximum Manufacturers of dental amalgams vary the composition of the ingredients within these limitations to achieve desired physical properties.

Trituration (i.e., amalgamation) of an amalgam takes place when the mercury is mixed with the other ingredients of the amalgam prior to insertion into the cavity preparation. Trituration may either be performed by hand utilizing a glass pestle and mortar or mechanically using a mechanical triturator. The purpose of trituration is to thoroughly mix the mercury with the other ingredients of the alloy in order to assure complete wetting of the surfaces of the alloy particles. The mercury and the other ingredients of the alloy react and begin to harden shortly after the commencement of trituration. This hardening is known as condensation, and the rate of condensation of an amalgam is of considerable interest to the dentist. A patient may be dismissed from a dental chair within 20 minutes after trituration of the amalgam and it is necessary in the course of this period the amalgam gain sufficient strength. The magnitude of early strength is effected by the alloy particle size and shape when the usual condensation technique is employed. For example, fine grain alloys appear to produce increased early strength. In addition, it is necessary that the amalgam shall be susceptible to carving immediately after condensation and shall remain so for at least 15 minutes after amalgamation. This allows the dentist to carve the amalgam restoration to allow proper bite by the patient.

While the presently effective specification does not specify required strength for dental amalgams, it is obvious that sufficient strength to resist fractures is a prime requisite to any restoring material. Fracturing, even in a small area, or fraying at the margin, is one of the main causes of reoccurrence of decay and subsequent clinical failure. Thus, any dental amalgam must provide adequate strength to resist masticatory forces. The new American Dental Association Specification No. 1 Revised, (hereinafter the "Revised ADA Specification") effective June 1, 1970, adds a diametrical tensile strength requirement to the physical properties of a dental amalgam. Thus, effective on June 1, 1970, the amalgam specimen must be able to withstand a force of 2.0 meganewtons per square meter (290 p.s.i.), fifteen minutes after trituration. At the present time, however, it is commonly recognized that amalgams must ultimately withstand forces up to 40,000 p.s.i. (i.e., the approximate strength of dentin).

Another physical property of a dental amalgam for which the American Dental Association has provided specifications is the physical property of flow. Flow may be described as the percentage decrease in length of a dental amalgam specimen when subjected to a static load for a specified period of time. The ADA Specification provides the test procedure to determine the flow properties of an amalgam and the present requirements are that the flow cannot exceed 4% reduction in the length of the specimen for the 21 hour period beginning 3 hours after trituration.

Thus, dental amalgams and their properties are well known to the art and have been compiled into the ADA Specification. This specification will soon be modified by the Revised ADA Specification effective June 1, 1970. As pointed out above, Revised ADA Specification does make changes in physical properties for dental amalgam by introducing a diametrical tensile strength requirement and by reducing the allowable flow from 4% to 3%.

In addition, it has long been recognized in the art that various oral compositions may provide a vehicle for an anticariogenic agent to achieve some anticariogenic effectiveness. Saffir, U.S. Pat. No. 2,665,218 suggests that dental amalgams and other oral compositions which touch the surface of a natural tooth could be used in combination with an anticariogenic agent to achieve some anticaries efficacy. However, the Saffir patent does not specifically relate to a dental amalgam and does nothing more than suggest the possibility that a fluoride containing amalgam may prove some anticariogenic efficacy. Moreover, what Saffir does not disclose is that attempts to produce anticariogenic amalgams have heretofore been unsuccessful because of the adverse effect that the addition of an anticariogenic agent has on the physical properties of the amalgam. An amalgam which provided a high degree of anticariogenic effectiveness is valueless if it lacks the physical properties necessary for clinical use, as exemplified by meeting the ADA Specification. A broken, chipped or cracked dental restoration must be replaced regardless of the anticariogenic properties that may exist at the margin of the restoration.

Thus, the present invention has for its primary object the provision of an anticariogenic amalgam that has demonstrated not only a high degree of anticariogenic effectiveness but which has a minimal effect in the physical properties of the amalgam alloy.

SUMMARY OF THE INVENTION

In accordance with the subject invention, an improved dental restorative amalgam alloy and method to reduce dental caries at the margin of a dental restoration has been discovered. Specifically, the improved amalgam alloy comprises a mixture of silver and a member selected from the group consisting of tin, copper and zinc and mixtures thereof which is adapted to be triturated with mercury to provide a dental amalgam and in which is provided up to about 1.0 percent by weight of stannous hexafluorozirconate, $SnZrF_6$. Further, it has been discovered that the incidence of dental caries at the margin of a dental restoration may be reduced by the method of placing in a prepared dental cavity the improved dental amalgam described above.

DESCRIPTION OF PREFERRED EMBODIMENTS

In accordance with the present invention, a silver alloy dental amalgam having improved anticariogenic and enamel solubility characteristics may be produced by adding up to about 1.0%, preferably at least about 0.5%, stannous hexafluorozirconate ($SnZrF_6$) to an amalgam comprising a minimum of 65% by weight silver, a maximum of 29% by weight tin, a maximum of 6% by weight copper, a maximum of 2% by weight zinc and a maximum of 3% by weight mercury.

The above percentage limits for the alloy ingredients to the amalgam are in accordance with the ADA Specification for the chemical composition for an alloy used in forming a dental amalgam. However, the ADA Specification provides deviations from maximum and minimum requirements that may be made or other elements that may be included, provided that adequate clinical and biological investigations are presented to the Council on Dental Materials and Devices of the American Dental Association to show that the alloy is safe for use in the oral cavity. For example, the following substances have been suggested on a case by case basis for incorporation into a dental amalgam: (1) indium (alloyed with mercury and commonly combined with a silver-tin alloy with up to 40, and preferably up to 25, percent indium); (2) gallium (alloyed with a small quantity of tin to form a gallium-tin eutectic which may then be combined with a variety of metals such as gold, nickel, copper, cobalt and palladium or certain alloys such as copper-tin and nickel-silicon alloys to form an amalgam; (3) copper (amalgamated with mercury in the presence or absence of up to 1% zinc and/or up to 2% tin); and (4) dispersion strengthened amalgams which utilize a filler consisting of filings from the silver-copper eutectic mixed with conventional tin-silver alloy. Thus, it should be specifically understood that while the preferred embodiment is in accordance with the chemical composition as specified in the ADA Specification, this invention is not limited thereto.

For the purposes of illustration and not limitation, the following examples of possible compositions of this invention (fluoride-alloy) are provided.

EXAMPLE I

| Constituent: | Parts by weight |
|---|---|
| Silver | 66.7 |
| Tin | 32.8 |
| $SnZrF_6$ | 0.5 |
| | 100.0 |

EXAMPLE II

| Constituent: | Parts by weight |
|---|---|
| Silver | 74.2 |
| Tin | 25.3 |
| $SnZrF_6$ | 0.5 |
| | 100.0 |

EXAMPLE III

| Constituent: | Parts by weight |
|---|---|
| Silver | 68.2 |
| Tin | 25.3 |
| Copper | 6.0 |
| $SnZrF_6$ | 0.5 |
| | 100.0 |

EXAMPLE IV

| Constituent: | Parts by weight |
|---|---|
| Silver | 71.6 |
| Tin | 26.0 |
| Zinc | 1.9 |
| $SnZrF_6$ | 0.5 |
| | 100.0 |

EXAMPLE V

| Constituent: | Parts by weight |
|---|---|
| Silver | 68.8 |
| Tin | 25.5 |
| Copper | 4.0 |
| Zinc | 1.2 |
| $SnZrF_6$ | 0.5 |
| | 100.0 |

EXAMPLE VI

| Constituent: | Parts by weight |
|---|---|
| Silver | 54.1 |
| Tin | 20.4 |
| Indium | 25.0 |
| $SnZrF_6$ | 0.5 |
| | 100.0 |

The method of preparing a tooth having a carious lesion for restoration is well known in the art. A dental drill is used by a dentist in order to remove all decayed tissue from the lesion in order to provide a prepared dental cavity. Once the cavity is properly prepared and the margins of the cavity preparation finished, a freshly triturated dental amalgam is inserted and carved to match the occlusion in accordance with accepted dental practices. To triturate the amalgam, either a hand pestle and mortar or a mechanical triturator may be used by the dentist. The purpose of trituration is to thoroughly separate and mix the particles of the alloy ingredients, remove oxides from the surface of the particles, and assure complete wetting of the surfaces of the particles by the mercury. The mercury is not added to the other ingredients until trituration since reaction commences immediately upon contact of the mercury with the surface of the alloy particles. Standard commercial amalgam alloys are packaged separately from the mercury for this reason. In addition, the alloy particle composition itself may be premixed by the manufacturer in order to assure even distribution of the ingredients and either compressed into pellet form or packaged in disposable capsules in volumes to allow trituration of a quantity of amalgam to restore the average cavity. Also, amalgam alloys are sold in bulk. The stannous hexafluorozirconate, $SnZrF_6$, of the present invention may be added to and mixed with the alloy particles prior to or at the commencement of trituration without affecting the effectiveness of this invention. Preferentially, however, the fluoride is carefully and thoroughly mixed prior to distribution. This is achieved by carefully grinding the fluoride compound to a fine powder and subsequently mixing thoroughly with the alloy filings using a tumbling or another comparable procedure.

In the instant invention, a method has been discovered in order to reduce the incidence of dental caries at the margin of a dental restoration and surrounding tooth enamel by the insertion into a prepared dental cavity of a dental restorative material of a composition comprising a mixture of silver with one or more members of a group comprising tin, copper, and zinc adapted to be triturated with mercury wherein is provided up to about 1.0 percent, and preferably at least about 0.5 percent stannous hexafluorozirconate ($SnZrF_6$). Specific embodiments of this method comprise the insertion of a restorative material as described in Examples I, et. seq. above into a prepared dental cavity.

Further, it has been discovered that utilization of the above method provides interim protection to the enamel and dental surfaces of a dental cavity from attack by oral acids pending corrective action if these surfaces are exposed as a result of chipping, breaking, expansion, or dislodging of the restorative material.

EXPERIMENTAL EVALUATION

The physical properties and the anticariogenic effectiveness of the dental amalgam of the present invention have been demonstrated by laboratory studies designed to measure: (1) the effects of the dental amalgam on enamel solubility; (2) the rate at which fluoride is released from the condensed dental amalgam; (3) the effects of the addition of anticariogenic additives on the strength of the amalgam; (4) the dimensional change of the amalgam during hardening; and (5) the flow of the amalgam after twenty-one hours.

In order to determine enamel solubility, various fluoride compounds were incorporated into a conventional fine-cut alloy amalgam at different concentrations. The alloys were placed on an enamel specimen, incubated in artificial saliva for twenty-four hours at 100° F., and subsequently removed. The enamel solubility of the underlying enamel was determined by using accepted procedures. These data, which are reported in Table I, indicate a superiority of $SnZrF_6$ and $InZrF_7$ over $SnF_2$ and $In_2(GeF_6)_3$ in their ability to reduce enamel solubility. Moreover, these data suggest that the maximum effect upon enamel solubility is achieved at a concentration between 0.5% and 1.0% $SnZrF_6$.

TABLE I.—SUMMARY OF ENAMEL SOLUBILITY DATA OBTAINED USING VARIOUS NON-ZINC, FINE-CUT AMALGAM PREPARATIONS

| Amalgam Sample | Net percent reduction [1] |
|---|---|
| $SnF_2$: | |
| 0.5% | 37.28 |
| 1.0% | 36.63 |
| $SnZrF_6$: | |
| 0.25% | 44.50 |
| 0.5% | 52.53 |
| 1.0% | 53.51 |
| $InZrF_7$: | |
| 0.25% | 50.95 |
| 0.5% | 38.26 |
| 1.0% | 53.54 |
| $In_2(GeF_6)_3$: | |
| 0.25% | 0.00 |
| 0.5% | 43.73 |
| 1.0% | 42.53 |

[1] As compared to the appropriate control values obtained with a control amalgam.

To determine the relative rate of fluoride release from different amalgam preparations containing various concentrations of different fluoride salts, plexiglass plastic blocks with cavities one centimeter in diameter were packed with the various fluoride salt containing amalgams and incubated in artificial saliva at 100° F. The artificial saliva solutions were changed at the end of one day, three days, one month, three months and six months and were analyzed for total fluoride contained therein. The results of these tests are presented in Tables II and III. The data contained in Table II were obtained using a fine-cut zinc containing amalgam alloy. The data contained in Table III were obtained using a non-zinc amalgam alloy. Table II shows that the greatest fluoride release occurs during the first twenty-four hours, with a continual release of fluoride throughout a six-month period. A comparison of the data contained in Table II indicates that at lower concentrations of 0.5% and 1.0%, the use of $SnZrF_6$ results in the greatest amount of fluoride release. At more elevated concentrations of 2.0% and 4.0%, the use of $In_2(GeF_6)_3$ results in the greatest release of fluoride. Similarly, the data contained in Table III for non-zinc alloy amalgams, indicate that very little fluoride is released from the alloys when the fluoride salt is added at a concentration of 0.25%. At a concentration of 0.5%, the use of $SnZrF_6$ again results in the greatest release of fluoride. Similarly, the use of $In_2(GeF_6)_3$ at more elevated concentrations of 1.0% to 4.0% resulted in the greatest release of fluoride. A comparison of the results contained in Tables II and III suggests that the use of a non-zinc alloy results in the greater release of fluorides compared to the use of a zinc-containing alloy.

TABLE II.—SUMMARY OF FLUORIDE RELEASE DATA FOR 6 MONTH PERIOD FROM VARIOUS AMALGAM PREPARATIONS (SERIES I)

| Alloy | Cumulative fluoride released (total µg. F.) | | | | |
|---|---|---|---|---|---|
| | 1 day | 3 days | 1 month | 3 months | 6 months |
| Control | 4 | 7 | 30 | 39 | 45 |
| 0.5% $SnF_2$ | 67 | 84 | 122 | 134 | 141 |
| 1.0% $SnF_2$ | 149 | 182 | 222 | 239 | 243 |
| 2.0% $SnF_2$ | 321 | 362 | 484 | 576 | 668 |
| 4.0% $SnF_2$ | 674 | 758 | 846 | 893 | 915 |
| 0.5% $SnZrF_6$ | 71 | 105 | 190 | 221 | 234 |
| 1.0% $SnZrF_6$ | 199 | 272 | 395 | 418 | 434 |
| 2.0% $SnZrF_6$ | 307 | 367 | 448 | 477 | 490 |
| 4.0% $SnZrF_6$ | 761 | 917 | 1,028 | 1,087 | 1,150 |
| 0.5% $InZrF_7$ | 35 | 53 | 110 | 126 | 142 |
| 1.0% $InZrF_7$ | 119 | 133 | 221 | 248 | 267 |
| 2.0% $InZrF_7$ | 325 | 366 | 471 | 497 | 508 |
| 4.0% $InZrF_7$ | 477 | 527 | 649 | 715 | 747 |
| 0.5% $In_2(GeF_6)_3$ | 71 | 89 | 133 | 146 | 162 |
| 1.0% $In_2(GeF_6)_3$ | 269 | 321 | 428 | 451 | 473 |
| 2.0% $In_2(GeF_6)_3$ | 373 | 420 | 568 | 607 | 646 |
| 4.0% $In_2(GeF_6)_3$ | 1,393 | 1,559 | 1,905 | 2,170 | 2,298 |
| 0.5% $CaF_2$ | 74 | 92 | 149 | 158 | 182 |
| 1.0% $CaF_2$ | 26 | 41 | 99 | 105 | 118 |
| 2.0% $CaF_2$ | 59 | 78 | 133 | 140 | 159 |
| 4.0% $CaF_2$ | 113 | 146 | 207 | 214 | 265 |

TABLE III.—SUMMARY OF FLUORIDE RELEASE DATA FROM VARIOUS PREPARATIONS (SERIES II)

| Alloy | Cumulative fluoride released (total μg.) | | | |
|---|---|---|---|---|
| | 1 day | 3 days | Total (0-3 days) | Net (0-3 days) |
| Control | 12 | 5 | 17 | |
| SnZrF$_6$: | | | | |
| 0.25% | 14 | 7 | 21 | 4 |
| 0.5% | 203 | 41 | 244 | 227 |
| 1.0% | 365 | 28 | 393 | 376 |
| 2.0% | 431 | 46 | 477 | 460 |
| 4.0% | 1,524 | 275 | 1,800 | 1,793 |
| InZrF$_7$: | | | | |
| 0.25% | 14 | 9 | 23 | 6 |
| 0.5% | 80 | 35 | 115 | 98 |
| 1.0% | 118 | 43 | 161 | 144 |
| 2.0% | 794 | 134 | 928 | 911 |
| 4.0% | 1,747 | 115 | 1,862 | 1,845 |
| In$_2$(GeF$_6$)$_3$: | | | | |
| 0.25% | 54 | 25 | 79 | 62 |
| 0.5% | 269 | 41 | 310 | 293 |
| 1.0% | 1,078 | 51 | 1,128 | 1,111 |
| 2.0% | 2,239 | 41 | 2,280 | 2,263 |
| 4.0% | 3,250 | 79 | 3,329 | 3,312 |
| SnF$_2$: | | | | |
| 0.5 | 96 | 27 | 123 | 106 |
| 1.0% | 204 | 35 | 239 | 222 |
| 2.0% | 623 | 99 | 722 | 705 |
| 4.0% | 1,236 | 166 | 1,402 | 1,385 |

The strength of conventional non-zinc fine-cut amalgam alloy containing various fluoride compounds was determined by measuring the compressive strength using a uniform cylindrical specimen of the dimensions comparable to the volume of a typical amalgam restoration. The compressive strength was determined at room temperature. The results of these tests are presented in Table IV and these data indicate that all compounds except SnZrF$_6$ tend adversely to affect compressive strength with increased concentrations, however, at a concentration of 1.0% or less all preparations were above the generally recognized value of 40,000 p.s.i. with the single exception of the alloy containing 1.0% In$_2$(GeF$_6$)$_3$. Thus, the use of SnZrF$_6$ at concentrations as great as 4.0% results in an acceptable formulation with regard to compressive strength, whereas InZrF$_7$ and In$_2$(GeF$_6$)$_3$ may be used only at concentrations of 1.0% and 0.5% or less, respectively.

TABLE IV.—THE EFFECT OF VARIOUS FLUORIDE COMPOUNDS IN AMALGAM [1] UPON COMPRESSIVE STRENGTH

| Concentration of agent (percent) | Compressive strength values (p.s.i.) | | | |
|---|---|---|---|---|
| | SnF$_2$ | SnZrF$_6$ | InZrF$_7$ | In$_2$(GeF$_6$)$_3$ |
| 0.0 | 52,000 | 52,000 | 52,000 | 52,000 |
| 0.5 | 52,000 | 44,500 | 41,500 | 46,000 |
| 1.0 | 51,100 | 45,800 | 48,000 | 39,000 |
| 2.0 | 42,750 | 44,000 | 32,000 | 38,000 |
| 4.0 | 42,250 | 44,000 | 30,000 | 20,000 |

[1] Fine-cut, non-zinc alloy.

In order to determine the dimensional change during hardening, tests were conducted in accordance with the Specification for dental amalgams. Specimens were prepared by condensing the amalgam into a rigid steel die having a cavity approximately five millimeters in diameter and ten millimeters long, using as far as possible the condensation technique given in the sheet of instructions accompanying the alloy. The die was maintained at 37±1° centigrade except during the packing of the specimen. The specimen was removed from the die as soon as condensation was completed and not later than ten minutes from the start of mixing. The specimen was then transferred to an environment of 37±1° centigrade. This specimen was placed in a measuring instrument and not subjected to restraint during the test. The initial measurement was made 15 minutes after the start of mixing. The final measurement was made at the end of twenty-four hours. During this test the temperature of the specimens was maintaineed at 37±1° centigrade. The results of this test are presented in Table V and these data show that all specimens were within the allowed range of plus or minus 20 microns per centimeter as specified in the revised ADA Specification.

TABLE V.—SUMMARY OF DIMENSIONAL CHANGE DATA WITH VARIOUS AMALGAM PREPARATIONS

| Amalgam sample composition | Dimensional change data (μ/cm.) | | |
|---|---|---|---|
| | First assay (50% Hg) | Second assay | |
| | | 50% Hg | 54% Hg |
| Control | +0.8 | −2.8 | |
| 0.5% SnF$_2$ | −0.3 | −4.6 | +2.9 |
| 1.0% SnF$_2$ | −0.5 | −5.0 | |
| 0.25% SnZrF$_6$ | | −3.0 | |
| 0.5% SnZrF$_6$ | −2.0 | −3.7 | |
| 1.0% SnZrF$_6$ | −0.6 | −1.6 | +2.3 |
| 0.25% In$_2$(GeF$_6$)$_3$ | | −5.0 | |
| 0.25% InZrF$_7$ | | +1.6 | +0.9 |

Note.—Standard error of method is ±1.5μ; alloys containing 50% Hg were considered dry; control amalgams normally range from −1 to −4 by the above procedure.

The flow properties of the amalgam containing various fluoride salts was determined in accordance with the ADA Specification. The specimens were a cylinder four millimeters in diameter and eight millimeters long prepared by condensing the amalgam into a rigid steel die having a cavity four millimeters in diameter and approximately eleven millimeters long, using as far as possible the technique given in the sheet of instructions accompanying the alloy. The die was maintained at 37±1° centigrade except during the packing of the specimen. The specimen was removed from the die upon completion of condensation and was then transferred to an environment of 37±1° centigrade. Prior to insertion in the flow micrometer, the ends were surface planed at right angles to the axis so that the length of the specimen was eight millimeters. Three hours after amalgamation was started, the specimen was subjected to a constant axial load of 105 kilograms per square centimeter. This load was maintained for twenty-one hours. The change in length of a specimen was determined and recorded.

Tests with amalgams containing In$_2$(GeF$_6$)$_3$ and InZrF$_7$ resulted in flow values in excess of the 4% limit even at minimum concentrations of 0.25% for the salts. At 0.25%, the flow value for In$_2$(GeF$_6$)$_3$ was 4.33% and InZrF$_7$ was 4.8%. Consequently, further tests with these compounds were not conducted. Stannous hexafluorozirconate, however, did not have the same result on the flow properties of the amalgam. The tests show that concentrations of 0.5% SnZrF$_6$ fell well below the 4% maximum allowable flow limit, and in fact, the tests indicated that concentrations between 0.5% and 1.0% may be utilized without increasing the amalgam flow properties above the limit. The results of the tests utilizing stannous fluoride (SnF$_2$) and stannous hexafluorozirconate (SnZrF$_6$) for comparison are compiled in Table VI.

TABLE VI

| Concentration of fluoride salt (percent) | Percent flow | |
|---|---|---|
| | SnF$_2$ | SnZrF$_6$ |
| 0 (control) | 2.0 | 2.0 |
| 0.5 | 4.0 | 3.4 |
| 1.0 | 4.5 | 4.2 |
| 2.0 | 5.3 | 5.4 |

It should be pointed out that the revised ADA Specification reduces the flow property requirements from 4% to 3%. At the present time most commercial dental amalgams exceed this 3% limit, and thus, there will be a revision of the composition of the commercial amalgams to comply with the new requirement. The present invention will not be rendered inoperable as a result of the revision of the ADA Specification since the variation in the flow properties of the present invention are proportional to the flow property of the alloy itself and the composition of the alloy may be varied to reduce the total flow below the new 3% requirement. The unique quality of this invention rests in the fact that the addition of stannous hexafluorozirconate, SnZrF$_6$, results in a surprisingly much lower proportional increase in the flow properties of an amalgam alloy than any other compound tested while providing an excellent degree of fluoride release which is indicated in both the enamel solubility and fluoride release test data.

In summation, the evaluations show that the dental amalgams of the present invention provide increased protection against dental caries at the margin of a dental restoration and also provide protection against attack by oral acids at the margin of the dental restoration and the interior surfaces of the tooth cavity if the restoration cracks or otherwise exposes the interior surface of the cavity. Further, these experimental evaluations show that the dental amalgams of the present invention meet the physical property requirements specified by the ADA Specification.

I claim:

1. In a dental restorative alloy composition comprising a mixture of silver and at least one member selected from the group consisting of tin, copper, indium, gallium, gold, nickel, cobalt, palladium, silicon, and zinc, which mixture is adapted to be triturated with mercury to provide a dental amalgam, the improvement comprising an effective amount up to about 1.0 percent by weight of stannous hexafluorozirconate, $SnZrF_6$, being provided in the composition.

2. An improvement, as claimed in claim 1, wherein the stannous hexafluorozirconate, $SnZrF_6$, is present at a level of at least about 0.5 percent by weight.

3. An anticariogenic dental alloy composition adapted for trituration with mercury to provide an anticariogenic dental amalgam, which composition comprises:

an effective amount up to about 1.0 percent by weight stannous hexafluorozirconate, $SnZrF_6$;

at least about 65 percent by weight of silver; and balance of a member selected from the group consisting of tin, copper, zinc, indium, gallium, gold, nickel, cobalt, palladium, silicon, and mixtures thereof.

4. An anticariogenic dental composition, as claimed in claim 3, wherein the member is tin and is present at a level of up to about 29 percent by weight.

5. An anticariogenic dental alloy composition, as claimed in claim 3, wherein the member is copper and is present at a level of up to about 6 percent by weight.

6. An anticariogenic dental alloy composition, as claimed in claim 3, wherein the member is zinc and is present at a level of up to about 2 percent by weight.

7. An anticariogenic dental alloy composition, as claimed in claim 3, wherein the stannous hexafluorozirconate, $SnZrF_6$, is present at a level of at least about 0.5 percent by weight.

References Cited

UNITED STATES PATENTS

| | | | |
|---|---|---|---|
| 2,665,218 | 1/1954 | Saffir | 106—35 |
| 3,266,867 | 8/1966 | Muhler | 23—51 |

L. DEWAYNE RUTLEDGE, Primary Examiner

E. L. WEISE, Assistant Examiner

U.S. Cl. X.R.

32—15; 75—173 C